United States Patent
Joko

(10) Patent No.: US 10,614,534 B2
(45) Date of Patent: *Apr. 7, 2020

(54) POWER MANAGEMENT SYSTEM, POWER MANAGEMENT METHOD, AND UPPER POWER MANAGEMENT APPARATUS

(71) Applicant: KYOCERA Corporation, Kyoto-shi, Kyoto (JP)

(72) Inventor: Shingo Joko, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,040

(22) Filed: Sep. 28, 2018

(65) Prior Publication Data

US 2019/0035036 A1 Jan. 31, 2019

Related U.S. Application Data

(63) Continuation of application No. 14/347,218, filed as application No. PCT/JP2012/072508 on Sep. 4, 2012, now Pat. No. 10,115,169.

(30) Foreign Application Priority Data

Sep. 26, 2011 (JP) .................................. 2011-209957

(51) Int. Cl.
*G06Q 50/06* (2012.01)
*H02J 3/14* (2006.01)
*H02J 13/00* (2006.01)

(52) U.S. Cl.
CPC ................ *G06Q 50/06* (2013.01); *H02J 3/14* (2013.01); *H02J 13/00007* (2020.01);
(Continued)

(58) Field of Classification Search
CPC .......... G06Q 50/06; H02J 3/14; H02J 13/002; Y04S 20/224; Y04S 20/222; Y02B 70/3225
See application file for complete search history.

(56) References Cited

U.S. PATENT DOCUMENTS

| 2004/0133314 A1 | 7/2004 | Ehlers et al. |
| 2008/0040295 A1 | 2/2008 | Kaplan et al. |

(Continued)

FOREIGN PATENT DOCUMENTS

| EP | 1306959 A2 | 5/2003 |
| EP | 2296112 A2 | 3/2011 |

(Continued)

OTHER PUBLICATIONS

Extended European Search Report dated Jun. 3, 2015 issued by the European Patent Office for Counterpart European Application No. EP 12837411.3.

(Continued)

*Primary Examiner* — Christopher E. Everett
(74) *Attorney, Agent, or Firm* — Procopio Cory Hargreaves and Savitch LLP

(57) ABSTRACT

A power management system comprises a plurality of HEMSs 10 and a CEMS 40. The CEMS 40 transmits, to a power company 60, configuration information of the plurality of consumers 70 managed by the CEMS 40. The power curtailment signal (DR; Demand Response) transmitted from the power company 60 to the CEMS 40 is determined in accordance with the configuration information. The upper power management apparatus transmits, to each HEMS 10, reduction information including an amount of power that should be reduced in each consumer 70 in response to a power curtailment signal transmitted from the power company 60 after transmitting the configuration information.

4 Claims, 7 Drawing Sheets

(52) U.S. Cl.
CPC ............ *Y02B 70/3225* (2013.01); *Y04S 10/60* (2013.01); *Y04S 20/222* (2013.01); *Y04S 20/224* (2013.01)

(56) References Cited

U.S. PATENT DOCUMENTS

| | | |
|---|---|---|
| 2008/0167756 A1 | 7/2008 | Golden et al. |
| 2009/0030712 A1 | 1/2009 | Bogolea et al. |
| 2010/0088261 A1 | 4/2010 | Montalvo |
| 2010/0141046 A1 | 6/2010 | Paik |
| 2010/0145884 A1 | 6/2010 | Paik |
| 2010/0213762 A1 | 8/2010 | Itoh et al. |
| 2010/0314942 A1 | 12/2010 | Talkin et al. |
| 2011/0060476 A1 | 3/2011 | Iino et al. |
| 2012/0232711 A1 | 9/2012 | Kiuchi et al. |

FOREIGN PATENT DOCUMENTS

| | | |
|---|---|---|
| JP | 61-285026 A | 12/1986 |
| JP | H6-335164 A | 12/1994 |
| JP | 2003-153465 A | 5/2003 |
| JP | 2003-244843 A | 8/2003 |
| JP | 2003-348771 A | 12/2003 |
| JP | 2004-180411 A | 6/2004 |
| JP | 2006-020391 A | 1/2006 |
| JP | 2008-099343 A | 4/2008 |
| JP | 2009-011150 A | 1/2009 |
| JP | 2010-075015 A | 4/2010 |
| JP | 2010-128810 A | 6/2010 |
| JP | 2010-136490 A | 6/2010 |
| JP | 2010-148244 A | 7/2010 |
| JP | 2010-200539 A | 9/2010 |
| JP | 2011-010497 A | 1/2011 |
| JP | 2011-135768 A | 7/2011 |
| JP | 2011-167048 A | 8/2011 |
| WO | 2010/065197 A2 | 6/2010 |
| WO | 2011/065498 A1 | 6/2011 |

OTHER PUBLICATIONS

Notification of Reasons for Refusal dated Sep. 6, 2016 issued in counterpart Japanese Application No. 2016-084245.

International Search Report; PCT/JP2012/072508; dated Nov. 13, 2012.

T. Maegawa, "Development of Community Energy Management System", IEICE Technical Report, Jul. 14, 2011, vol. 111, No. 146, pp. 99-104.

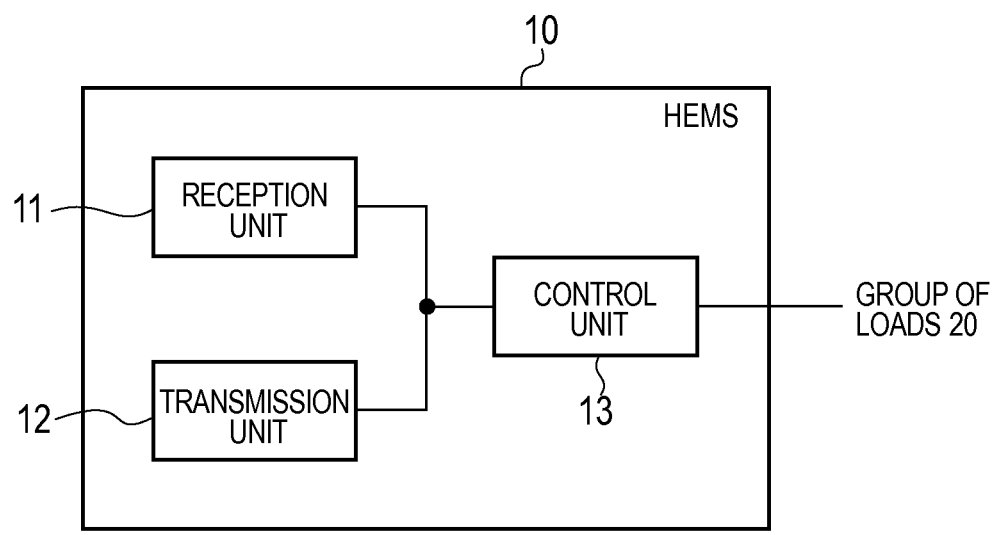
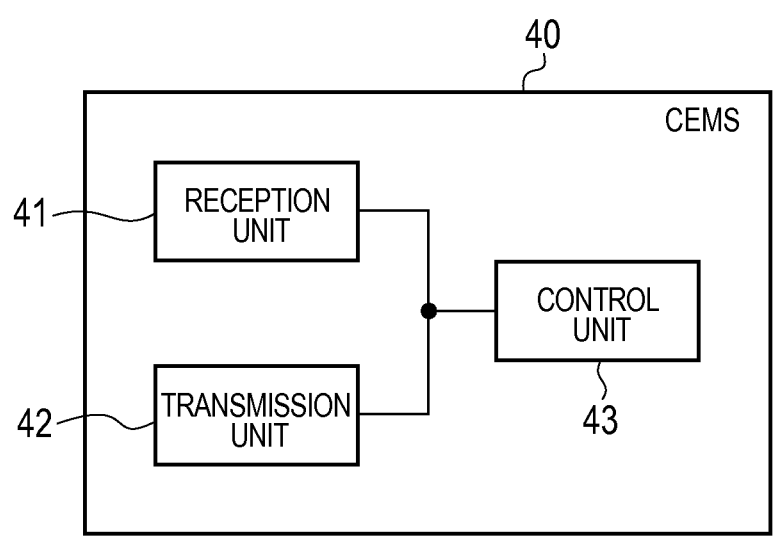

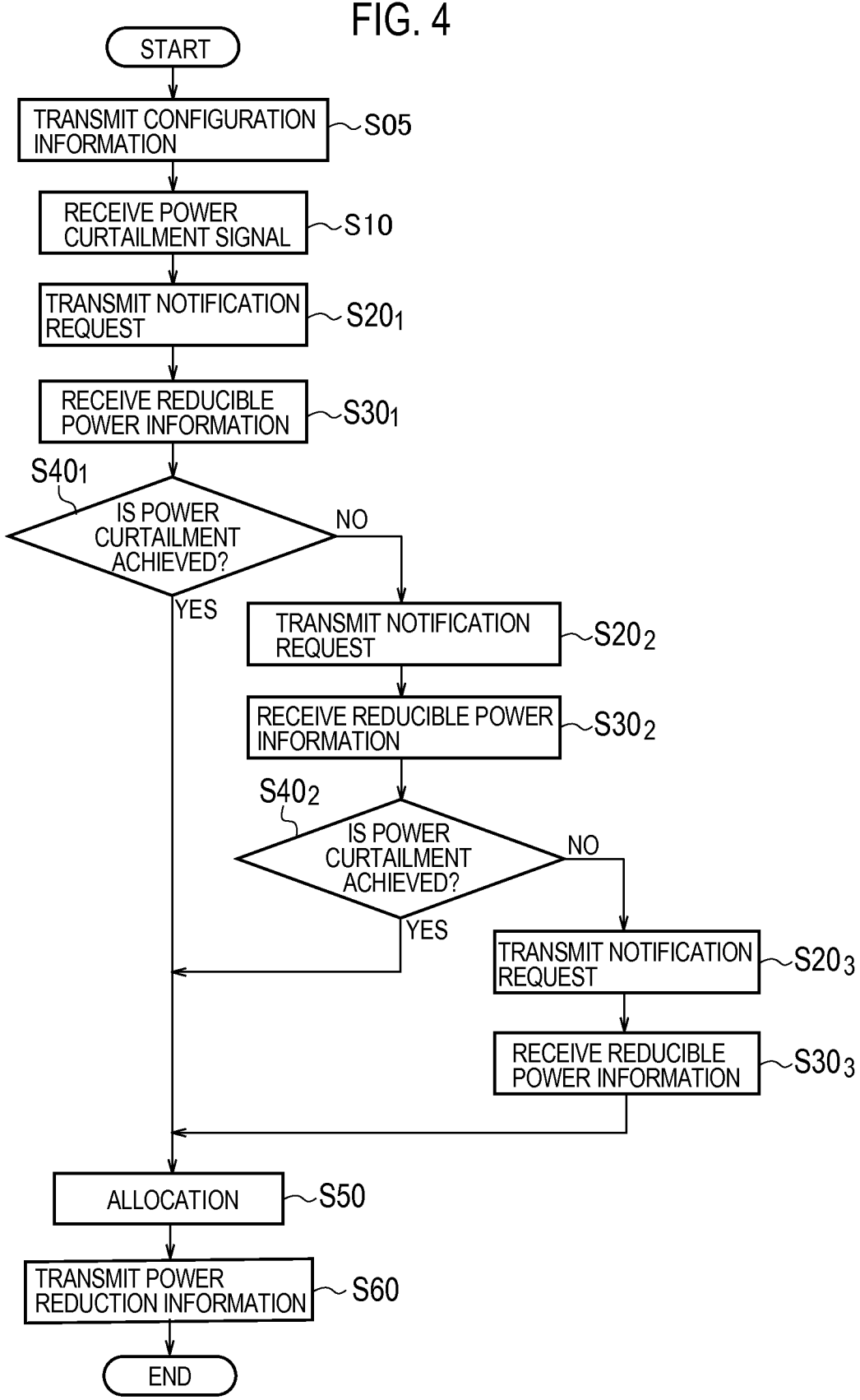

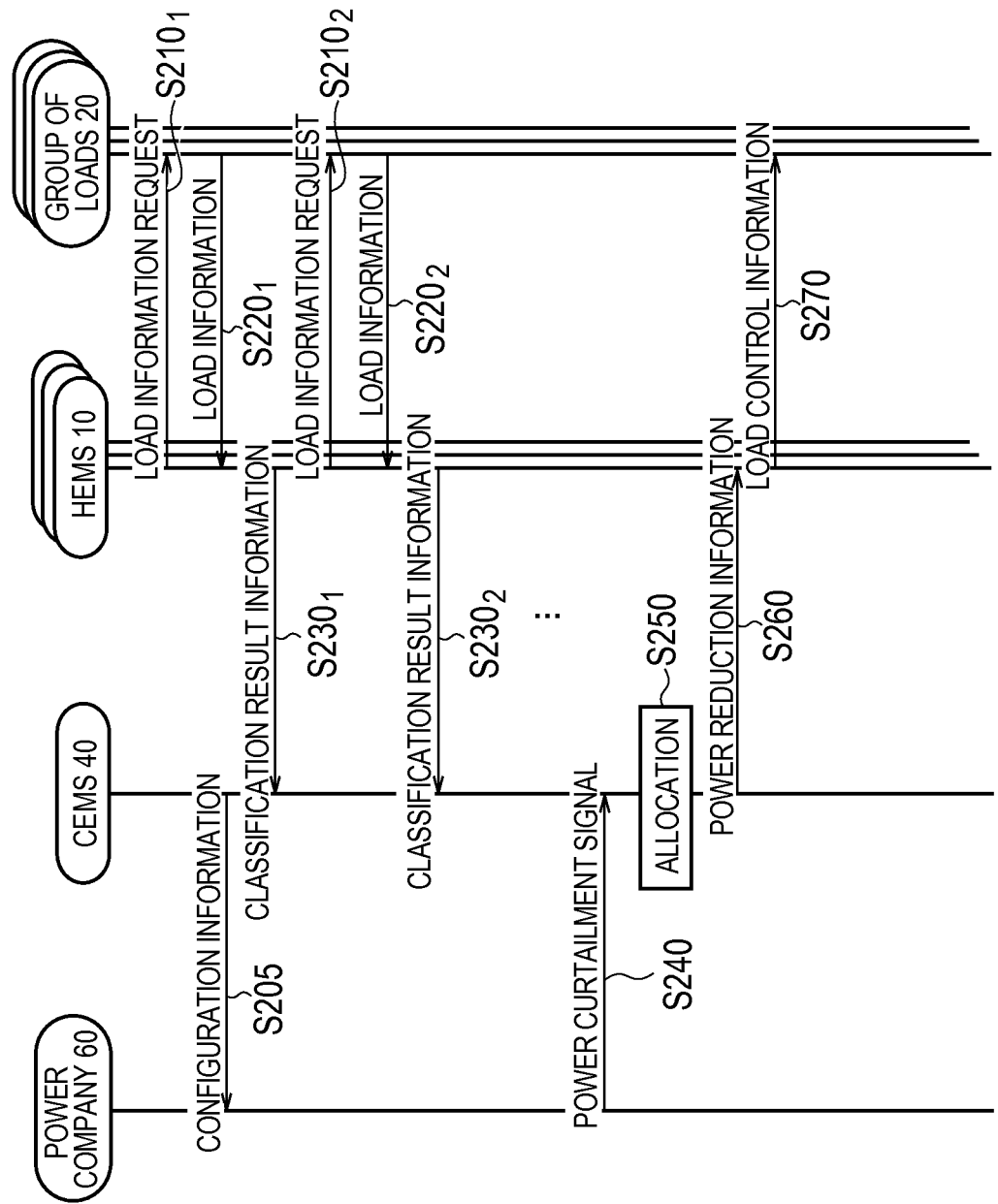

POWER MANAGEMENT SYSTEM, POWER MANAGEMENT METHOD, AND UPPER POWER MANAGEMENT APPARATUS

The present invention is a continuation of U.S. application Ser. No. 14/347,218 filed on Mar. 25, 2014 which is a National Phase entry of International Application No. PCT/JP2012/072508, filed on Sep. 4, 2012, which claims the benefit of Japanese Application No. 2011-209957, filed on Sep. 26, 2011. The contents of the above applications are incorporated by reference herein in their entirety.

TECHNICAL FIELD

The present invention relates to a power management system, a power management method, and an upper power management apparatus that reduce power consumed by a load provided in a plurality of consumers.

BACKGROUND ART

In recent years, it is known a technology of controlling, by a power management apparatus (for example, HEMS: Home Energy Management System) provided in each consumer, a load provided in a consumer and a dispersed power source provided in a consumer, for example.

Examples of the dispersed power source may include a power generation equipment that utilizes clean energy such as sunlight, wind power, and geothermal energy. Alternatively, examples of the dispersed power source may also include a fuel cell such as SOFC (Solid Oxide Fuel Cell).

In such a system, when it is expected that an amount of power to be supplied from a power grid is smaller than a total amount of power consumed in a consumer connected to the power grid, a power company that manages the power grid transmits, to each power management apparatus, a power curtailment signal (DR: Demand Response) instructing restraint of an amount of power consumed, and each power management apparatus reduces power consumed by a load in response to the power curtailment signal (for example, Patent Literature 1). The power curtailment signal is a signal indicating an amount of power that should be reduced by each consumer (for example, a ratio of power to be reduced relative to power currently consumed, or an absolute value of power to be reduced relative to power currently consumed).

CITATION LIST

Patent Literature

Patent Literature 1: Japanese Patent Application Publication 2010-128810

SUMMARY OF THE INVENTION

In this case, from a viewpoint of a power company, it may suffice that the total amount of power consumed is reduced irrespective of an amount of power reduced by each consumer connected to the power grid. However, there is a need of considering situations of a plurality of consumers (power management apparatuses).

Therefore, the present invention has been achieved in order to solve the above-described problem, and an object thereof is to provide a power management system, a power management method, and an upper power management apparatus with which it is possible to appropriately restrain an amount of power consumed by a load provided in each consumer.

A power management system according to the first feature comprises a plurality of lower power management apparatuses each of which is provided for each of a plurality of consumers and an upper power management apparatus that manages the plurality of lower power management apparatuses. The upper power management apparatus transmits, to a power company that manages a power grid, configuration information of the plurality of consumers managed by the upper power management apparatus. The upper power management apparatus transmits, to each lower power management apparatus, reduction information including an amount of power that should be reduced in each consumer in response to a power curtailment signal transmitted from the power company after transmitting the configuration information.

In the first feature, the power curtailment signal is determined by the power company in accordance with the configuration information.

In the first feature, the power curtailment signal includes an amount of power that should be reduced from an amount of power currently consumed by a load connected to the power grid.

In the first feature, the configuration information is any one of the number of the lower power management apparatuses managed by the upper power management apparatus, the number of consumers managed by the upper power management apparatus, the number of residents of a consumer managed by the upper power management apparatus, the location of a lower power management apparatus managed by the upper power management apparatus, the location of a consumer managed by the upper power management apparatus, an area of a region managed by the upper power management apparatus, an amount of power that can be supplied by a dispersed power source provided within the consumer managed by the upper power management apparatus, a predicted amount of power that can be supplied by the dispersed power source provided within the consumer managed by the upper power management apparatus, and a predicted amount of power consumed by the load provided within the consumer managed by the upper power management apparatus.

In the first feature, the upper power management apparatus transmits, to each lower power management apparatus, a notification request for requesting a notification of an amount of power that can be reduced from power currently consumed for each category to which a load connected to each lower power management apparatus belongs, in response to a power curtailment signal transmitted from a power company that manages a power grid. The lower power management apparatus transmits, to the upper power management apparatus, reducibility information for each of the categories including the amount of the power that can be reduced from the power currently consumed in response to the notification request. The upper power management apparatus transmits, to each lower power management apparatus, reduction information including the amount of power that should be reduced in each consumer, in response to the power curtailment signal and the reducibility information.

In the first feature, each lower power management apparatus transmits, to the upper power management apparatus, power information including an amount of power consumed for each category to which a load connected to each lower power management apparatus belongs. The upper power management apparatus transmits, to each lower power management apparatus, the reduction information in response to the power curtailment signal and the power information.

In the first feature, the category has a priority. The upper power management apparatus decides the amount of power that should be reduced in each consumer so as to preferentially reduce power consumed by a load belonging to a category having a lower priority.

In the first feature, the upper power management apparatus decides the amount of power that should be reduced in each consumer, in accordance with a coefficient corresponding to a contract of a maximum current value available for each consumer.

A power management method according to the second feature is applied to a power management system comprising a plurality of lower power management apparatuses each of which is provided for each of a plurality of consumers and an upper power management apparatus that manages the plurality of lower power management apparatuses. The power management method comprises: a step of transmitting, from the upper power management apparatus to a power company that manages a power grid, configuration information of a plurality of consumers managed by the upper power management apparatus; and a step of transmitting, from the upper power management apparatus to each lower power management apparatus, reduction information including an amount of power that should be reduced in each consumer, after transmitting the configuration information, in response to a power curtailment signal transmitted from the power company.

In the second feature, the power curtailment signal is determined by the power company in accordance with the configuration information.

In the first feature, the power curtailment signal includes an amount of power that should be reduced from an amount of power currently consumed by a load connected to the power grid.

An upper power management apparatus according to the third feature manages a plurality of lower power management apparatuses each of which is provided for each of a plurality of consumers. The upper power management apparatus comprises: a transmission unit that transmits, to a power company that manages a power grid, configuration information of the plurality of consumers managed by the upper power management apparatus. The transmission unit transmits, to each lower power management apparatus, reduction information including an amount of power that should be reduced in each consumer, in response to a power curtailment signal transmitted from the power company after transmitting the configuration information.

In the third feature, the power curtailment signal is determined by the power company in accordance with the configuration information.

In the third feature, the power curtailment signal includes an amount of power that should be reduced from an amount of power currently consumed by a load connected to the power grid.

The present invention can provide a power management system, a power management method, and an upper power management apparatus with which it is possible to appropriately restrain an amount of power consumed by a load provided in each consumer.

BRIEF DESCRIPTION OF THE DRAWINGS

FIG. 2 is a block diagram showing the HEMS 10 according to the first embodiment.

FIG. 3 is a block diagram showing the CEMS 40 according to the first embodiment.

FIG. 4 is a flowchart showing a power management method according to the first embodiment.

FIG. 8 is a sequence diagram showing a power management method according to the first modification.

DESCRIPTION OF THE EMBODIMENT

Hereinafter, the power management system according to the embodiment of the present invention will be described. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

SUMMARY OF THE EMBODIMENT

A power management system according to the embodiment comprises a plurality of lower power management apparatuses each of which is provided for each of a plurality of consumers and an upper power management apparatus that manages the plurality of lower power management apparatuses. The upper power management apparatus transmits, to a power company that manages a power grid, configuration information of the plurality of consumers managed by the upper power management apparatus. The upper power management apparatus transmits, to each lower power management apparatus, reduction information including an amount of power that should be reduced in each consumer in response to a power curtailment signal transmitted from the power company after transmitting the configuration information.

Therefore, an appropriate power curtailment signal is transmitted to each of a plurality of upper power management apparatuses, and it is possible to appropriately restrain the amount of power consumed by a load provided within each consumer.

First Embodiment (Configuration of Power Management System)

Figure 1:
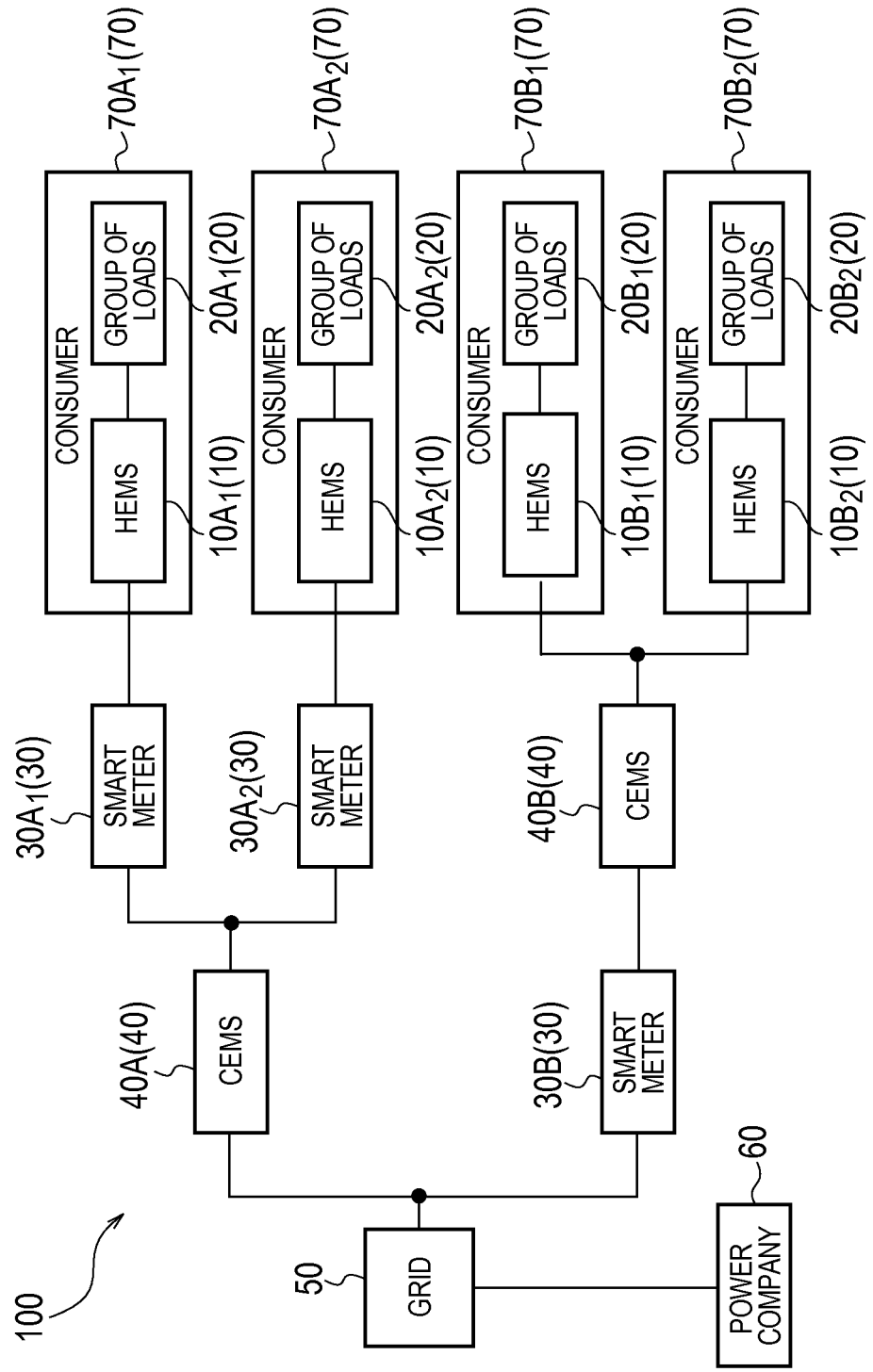
FIG. 1 is a diagram showing a power management system 100 according to the first embodiment.

Hereinafter, a power management system according to a first embodiment will be described. FIG. 1 is a diagram showing a power management system 100 according to the first embodiment.

As shown in FIG. 1, the power management system 100 includes an HEMS 10, a group of loads 20, a smart meter 30, a CEMS 40, a grid 50, and a power company 60. The HEMS 10 and the group of loads 20 are provided within a consumer 70.

The HEMS 10 is an apparatus (HEMS: Home Energy Management System) that manages power of the consumer 70. In the first embodiment, the HEMS 10 includes a function of controlling the group of loads 20 by using a protocol such as ECHONET Lite or ZigBee. For example, the HEMS 10 is capable of controlling the power consumed by the group of loads 20 by controlling an operation mode of the group of loads 20.

In the first embodiment, as the HEMS 10, an HEMS $10A_1$, an HEMS $10A_2$, an HEMS $10B_1$, and an HEMS $10B_2$ are provided. Further, the HEMS 10 is an example of a lower power management apparatus. The HEMS 10 will be described in detail later (see FIG. 2).

The group of loads 20 is a group of equipment by which power is consumed. Examples of the group of loads 20 include equipment such as a refrigerator, lighting, an air conditioner, and TV. Further, a dispersed power source such as a storage battery, a photovoltaic power generation equipment (PV), and a fuel cell (SOFC) may be provided within the consumer 70.

In this case, it is possible to classify a load included in the group of loads 20 (that is, a load connected to the HEMS 10) into a plurality of categories. Further, each category has a priority.

For example, the load is classified into three categories (categories A to C). The category A is a category to which a load (for example, a refrigerator), for example, indispensable in a daily life, belongs. The category B is a load (for example, lighting and an air conditioner) directly related to a daily life, other than loads belonging to the category A. The category C is a load (for example, TV) not belonging to the category A nor the category B. In this case, the category A has the highest priority, and the category C has the lowest priority.

The category is basically set previously to each load; however, the category is preferably changeable by a user. For example, even when a category of a certain load is set as the category C at the time of product shipment, it is preferable that the category be changeable to another category depending on each usage manner of a user. The HEMS 10 stores information notifying the category to which the load belongs, periodically received from each load included in the group of loads 20, for example. Alternatively, when a category of a load included in the group of loads 20 is changed (for example, when a new load is added to the group of loads 20, or when the category of the load is changed), the HEMS 10 receives the information for notifying the change in category from the load and stores the information.

In the first embodiment, as the group of loads 20, a group of loads $20A_1$, a group of loads $20A_2$, a group of loads $20B_1$, and a group of loads $20B_2$ are provided. The HEMS $10A_1$ and the group of loads $20A_1$ are provided within a consumer $70A_1$, and the HEMS $10A_2$ and the group of loads $20A_2$ are provided within a consumer $70A_2$. Likewise, the HEMS $10B_1$ and the group of loads $20B_1$ are provided within a consumer $70B_1$, and the HEMS $10B_2$ and the group of loads $20B_2$ are provided within a consumer $70B_2$.

Basically, the smart meter 30 is a meter that measures power consumed by the group of loads 20. In the first embodiment, the smart meter 30 includes a communication function, and is capable of receiving information from the HEMS 10, the CEMS 40, and the grid 50 (power company 60).

In the first embodiment, as the smart meter 30, a smart meter $30A_1$, a smart meter $30A_2$, and a smart meter 30B are provided. As shown in FIG. 1, the smart meter 30 may be provided closer to the grid 50 than the CEMS 40, or may be provided closer to the consumer 70 than the CEMS 40.

The CEMS 40 is an apparatus (CEMS: Community Energy Management System) that manages a plurality of HEMSs 10. The CEMS 40 collects information from each HEMS 10 and provides instruction for an operation to each HEMS 10.

In the first embodiment, as the CEMS 40, a CEMS 40A and a CEMS 40B are provided. Further, the CEMS 40 is an example of an upper power management apparatus. The CEMS 40 will be described in detail later (see FIG. 3).

The grid 50 is a power line for supplying each consumer 70 with power supplied from a power station, etc. The power company 60 is a business operator managing the grid 50.

The consumer 70 is a unit managed by one HEMS 10. For example, the consumer 70 may be a single house or a housing complex such as an apartment house. Alternatively, the consumer 70 may be a dwelling unit configuring a housing complex.

(Lower Power Management Apparatus)

Hereinafter, a lower power management apparatus according to the first embodiment will be described. FIG. 2 is a block diagram showing the HEMS 10 (an example of the lower power management apparatus) according to the first embodiment. As shown in FIG. 2, the HEMS 10 includes a reception unit 11, a transmission unit 12, and a control unit 13.

The reception unit 11 receives various information from the CEMS 40. Firstly, the reception unit 11 receives, from the CEMS 40, a notification request for requesting a notification of an amount of power that can be reduced from power currently consumed. In particular, the reception unit 11 receives the notification request for each category.

Secondly, the reception unit 11 receives reduction information including the amount of power that should be reduced in each consumer 70, from the CEMS 40. In this case, it should be noted that the reduction information includes an amount of power to be reduced for each category.

The transmission unit 12 transmits various information to the CEMS 40. The transmission unit 12 transmits reducible information including an amount of power that can be reduced from the power currently consumed, to the CEMS 40. In particular, the transmission unit 12 transmits, to the CEMS 40, the reducible information for each category.

The amount of power that can be reduced may be a numerical value manually input by a user, or a numerical value calculated by the HEMS 10 on the basis of a use history of a load stored in the HEMS 10. Alternatively, when a dispersed power source is provided within the consumer 70, the amount of power that can be reduced may include not only an amount of power reduced by an operation suspension of a load but also an amount of power reduced that is achieved when the power supply from the grid 50 is reduced as a result of the group of loads 20 being supplied with output power from the dispersed power source.

The control unit 13 comprehensively controls the HEMS 10. The control unit 13 controls the group of loads 20 connected to the HEMS 10 by using a signal that complies with a protocol such as ECHONET Lite or ZigBee. In particular, the control unit 13 is capable of controlling the power consumed by the group of loads 20 by controlling an operation mode of the group of loads 20. Specifically, the control unit 13 transmits, to the load included in the group of loads 20, a signal for switching to an operation mode in which it is possible to reduce the power consumed, in response to the reduction information received from the CEMS 40.

In this case, the control unit 13 grasps a category to which the load included in the group of loads 20 belongs. Further, the control unit 13 grasps power consumed by the load (power currently consumed) included in the group of loads 20.

When the dispersed power source is provided within the consumer 70, the control unit 13 grasps output power from the dispersed power source. Accordingly, when the power consumed by the group of loads 20 is reduced, the control unit 13 may not only stop the operation of the load but also replace at least a part of the power supplied to the group of loads 20 with the output power from the dispersed power source.

(Upper Power Management Apparatus)

Hereinafter, an upper power management apparatus according to the first embodiment will be described. FIG. 3 is a block diagram showing the CEMS 40 (an example of the upper power management apparatus) according to the first embodiment. As shown in FIG. 3, the CEMS 40 includes a reception unit 41, a transmission unit 42, and a control unit 43.

The reception unit 41 receives various information from the HEMS 10 and the power company 60. Firstly, the reception unit 41 receives, from the power company 60, a power curtailment signal (DR; Demand Response) instructing restraint of an amount of power consumed. It should be noted that an amount to be reduced designated by the power curtailment signal is an amount of power that should be reduced in a whole of the plurality of consumers 70 provided under the CEMS 40.

Secondly, the reception unit 41 receives, from each HEMS 10, reducible information including an amount of power that can be reduced from the power currently consumed. In particular, the reception unit 41 receives, from the HEMS 10, the reducible information for each category.

The transmission unit 42 transmits various information to the HEMS 10. Firstly, the transmission unit 42 transmits, to each HEMS 10, a notification request for requesting a notification of an amount of power that can be reduced from power currently consumed. In particular, the transmission unit 42 transmits the notification request for each category.

Secondly, the transmission unit 42 transmits reduction information including the amount of power that should be reduced in each consumer 70, to the HEMS 10. As described above, it should be noted that the reduction information includes an amount of power to be reduced for each category.

Thirdly, the transmission unit 42 transmits, to the power company 60, configuration information of the plurality of consumers 70 managed by the CEMS 40. It is preferable that the transmission unit 42 periodically transmits, to the power company 60, the configuration information of the plurality of consumers 70.

Here, the configuration information of the plurality of consumers 70 managed by the CEMS 40 includes, for example, the following information. The configuration information suffices to include at least one piece of information of the following information (a) to information (i).

(a) The number of the HEMSs 10 managed by the CEMS 40

(b) The number of the consumers 70 managed by the CEMS 40

(c) The number of residents of the consumer 70 managed by the CEMS 40

(d) The location of the HEMS 10 managed by the CEMS 40

(e) The location of the consumer 70 managed by the CEMS 40

(f) The area of a region managed by the CEMS 40

(g) The amount of power that can be supplied by the dispersed power source provided within the consumer 70 managed by the CEMS 40

(h) The predicted amount of power that can be supplied by the dispersed power source provided within the consumer 70 managed by the CEMS 40

(i) The predicted amount of power consumed by the load provided within the consumer 70 managed by the CEMS 40

In the first embodiment, the power company 60 determines a power curtailment signal (DR; Demand Response) that should be transmitted to the CEMS 40 in accordance with the configuration information received from the CEMS 40. Specifically, the power company 60 determines the power curtailment signal (DR; Demand Response) so that a sense of unfairness does not arise among the consumers 70 managed by each CEMS 40.

For example, when the information (a) is used, the power curtailment signal is determined so that the larger the number of the HEMSs 10 is, the larger the amount to be reduced designated by the power curtailment signal becomes.

When the information (b) is used, the power curtailment signal is determined so that the larger the number of the consumers 70 is, the larger the amount to be reduced designated by the power curtailment signal becomes.

When the information (c) is used, the power curtailment signal is determined so that the larger the number of the residents of the consumer 70 is, the larger the amount to be reduced designated by the power curtailment signal becomes.

When the information (d) is used, the power curtailment signal is determined for the HEMSs 10 that are in a location close to each other so that the amounts to be reduced designated by the power curtailment signal are equal.

When the information (e) is used, the power curtailment signal is determined for the consumers 70 that are in a location close to each other so that the amounts to be reduced designated by the power curtailment signal are equal.

When the information (f) is used, the power curtailment signal is determined so that the larger the area of the region is, the larger the amount to be reduced designated by the power curtailment signal becomes.

When the information (g) is used, the power curtailment signal is determined so that the larger the amount of power that can be supplied is, the larger the amount to be reduced designated by the power curtailment signal becomes.

When the information (h) is used, the power curtailment signal is determined so that the larger the predicted amount of power that can be supplied is, the larger the amount to be reduced designated by the power curtailment signal becomes.

When the information (i) is used, the power curtailment signal is determined so that the smaller the predicted amount of power consumed by the load is, the larger the amount to be reduced designated by the power curtailment signal becomes.

The control unit 43 comprehensively controls the CEMS 40. Firstly, the control unit 43 determines whether or not the power curtailment designated by the power curtailment signal is achieved in accordance with the reducible information received from each HEMS 10. In particular, the control unit 43 collects the reducible information in order of a priority of a category from lowest, and determines whether or not the power curtailment is achieved by reduction in power consumed by the load belonging to the category having a lower priority.

The reducible information is collected by transmitting the notification request. For example, the control unit 43 collects the reducible information corresponding to the category C by transmitting the notification request corresponding to the category C having the lowest priority. The control unit 43 collects the reducible information corresponding to the category B by transmitting the notification request corresponding to the category B, when the power curtailment is not achieved by reduction in the power consumed by the load belonging to the category C. The control unit 43 collects the reducible information corresponding to the category A by transmitting the notification request corresponding to the category A having the highest priority, when the power curtailment is not achieved by reduction in the power consumed by the load belonging to the category B.

Secondly, the control unit 43 allocates the amount of power that should be reduced in each consumer 70 according to the reducible information received for each category.

For example, an amount of power to be reduced R(i) that should be reduced in a consumer (i), or HEMS (i), is calculated according to the following procedure, for example. In this case, as a category to which a load belongs, a case where the categories A to C exist is provided as an example.

Firstly, in a case where the power curtailment is achieved by reduction in power consumed by the load belonging to the category C, the amount of power to be reduced R(i) is calculated by the following Equation (1).

$$R(i)=P_C(i) \times c(i) \times PDR/P_C\text{SUM} \qquad \text{Equation (1), wherein}$$

$$\Sigma P_C(i) \times c(i) = P_C\text{SUM}$$

In this case, $P_C(i)$ denotes an amount of power that can be reduced (amount of power included in the reducible information) for a load belonging to the category C at the consumer (i). PDR denotes an amount of power to be reduced designated by the power curtailment signal, and specifically, denotes an amount of power that should be reduced in a whole of the plurality of consumers 70 provided under the CEMS 40. $P_C\text{SUM}$ is a sum of the amount of power that can be reduced for the load belonging to the category C, in a whole of the plurality of consumers 70 provided under the CEMS 40.

c(i) is a coefficient corresponding to a contract of a maximum current value available for the consumer (i). Preferably, the greater the contracted maximum current value is, the greater a value of c(i) is. It is noted that c(i) may be a constant value (for example, "1").

Secondly, in a case where the power curtailment is achieved by reduction in power consumed by the load belonging to the category C and the category B, the amount of power to be reduced R(i) is calculated by the following Equation (2).

$$R(i)=P_C(i)+P_B(i) \times b(i) \times (PDR-P_C\text{SUM})/P_B\text{SUM} \qquad \text{Equation (2),}$$

wherein $$\Sigma P_B(i) \times b(i) = P_B\text{SUM}$$

In this case, $P_B(i)$ denotes an amount of power that can be reduced (amount of power included in the reducible information) for a load belonging to the category B at the consumer (i). $P_B\text{SUM}$ is a sum of the amount of power that can be reduced for the load belonging to the category B, in a whole of the plurality of consumers 70 provided under the CEMS 40.

b(i) is a coefficient corresponding to a contract of a maximum current value available for the consumer (i). Preferably, the greater the contracted maximum current value is, the greater a value of b(i) is. It is noted that b(i) may be a constant value (for example, "1"). Further, b(i) may be the same in value as c(i), or may be different in value from c(i).

Thirdly, in a case where the power curtailment is not achieved by reduction in power consumed by the load belonging to the category C and the category B, the amount of power to be reduced R(i) is calculated by the following Equation (3).

$$R(i)=P_C(i)+P_B(i)+P_A(i) \times a(i) \times (PDR-P_C\text{SUM}-P_B\text{SUM})/P_A\text{SUM} \qquad \text{Equation (3),}$$

wherein $$\Sigma P_A(i) \times a(i) = P_A\text{SUM}$$

In this case, $P_A(i)$ denotes an amount of power that can be reduced (amount of power included in the reducible information) for a load belonging to the category A at the consumer (i). $P_A\text{SUM}$ is a sum of the amount of power that can be reduced for the load belonging to the category A, in a whole of the plurality of consumers 70 provided under the CEMS 40.

a(i) is a coefficient corresponding to a contract of a maximum current value available for the consumer (i). Preferably, the greater the contracted maximum current value is, the greater a value of a(i) is. It is noted that a(i) may be a constant value (for example, "1"). Further, a(i) may be the same in value as c(i) or b(i), or may be different in value from c(i) or b(i).

(Power Management Method)

Figure 5:
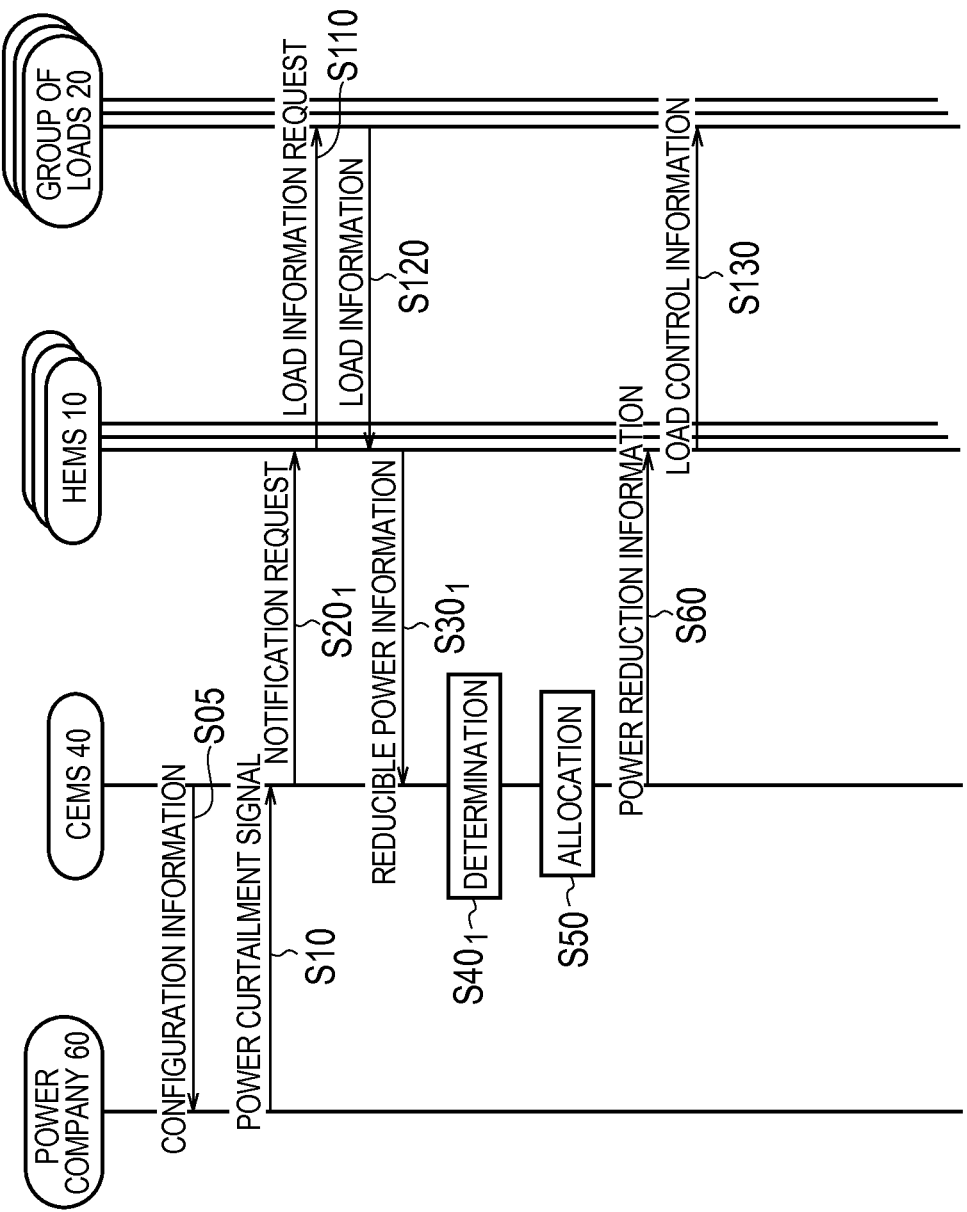
FIG. 5 is a sequence diagram showing a power management method according to the first embodiment.
Figure 6:
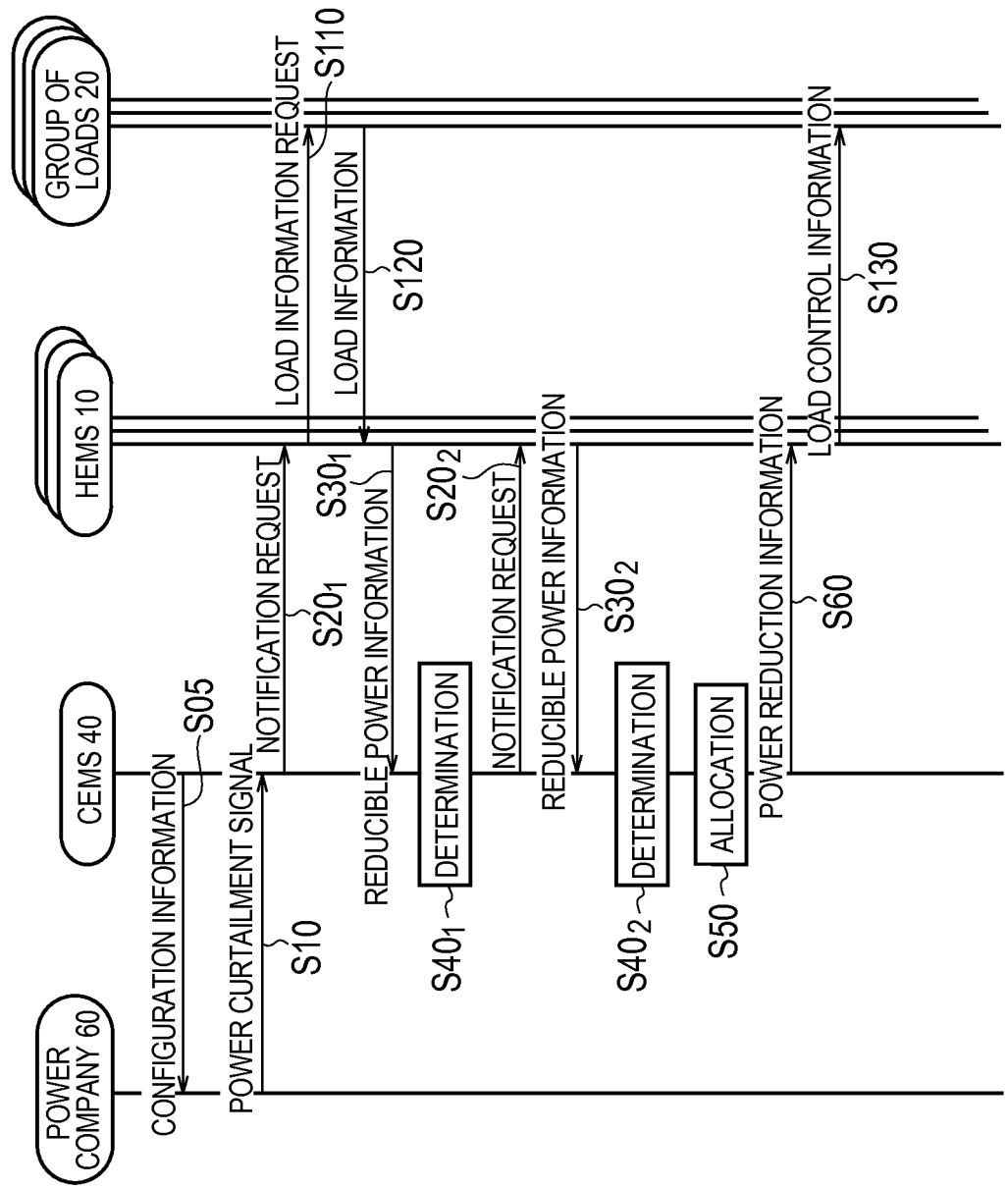
FIG. 6 is a sequence diagram showing a power management method according to the first embodiment.
Figure 7:
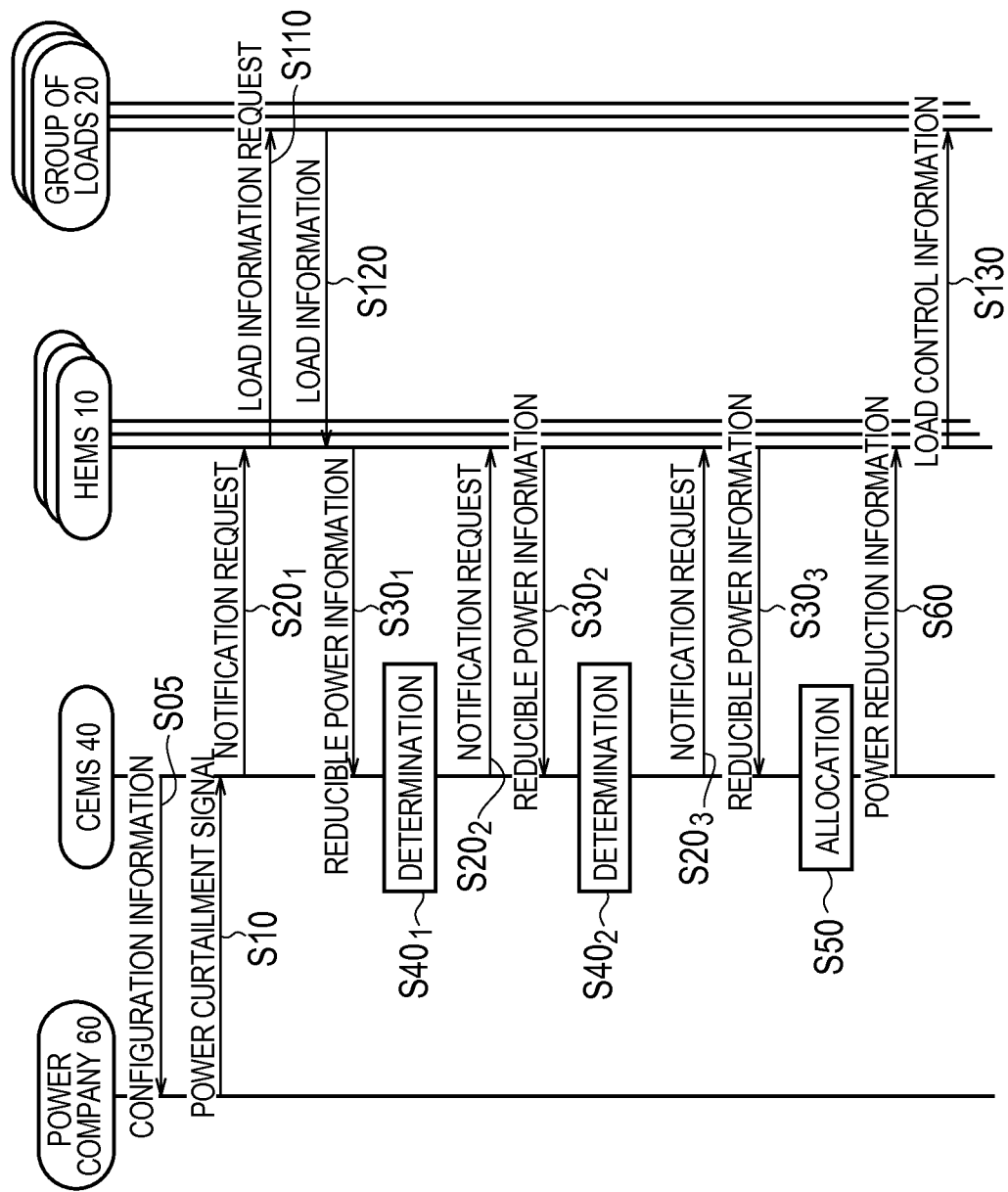
FIG. 7 is a sequence diagram showing a power management method according to the first embodiment.

Hereinafter, a power management method according to the first embodiment will be described. FIG. 4 is a flowchart showing an operation of the CEMS 40 according to the first embodiment. FIG. 5 to FIG. 7 are sequence diagrams showing an operation of the power management system 100 according to the first embodiment.

In particular, FIG. 5 is a sequence diagram of a case where a determination result in step 40$_1$ shown in FIG. 4 is "YES". FIG. 6 is a sequence diagram of a case where the determination result in step 40$_1$ shown in FIG. 4 is "NO", and a case where a determination result in step 40$_2$ shown in FIG. 4 is "YES". FIG. 7 is a sequence diagram of a case where the determination result in step 40$_1$ shown in FIG. 4 is "NO", and a case where the determination result in step 40$_2$ shown in FIG. 4 is "NO".

It should be noted that, in FIG. 4 to FIG. 7, the same step number is assigned to the same step. Therefore, mainly, FIG. 4 will be described as a typical example, below.

As shown in FIG. 4, in step 05, the CEMS 40 transmits, to the power company 60, the configuration information of the plurality of consumers 70 managed by the CEMS 40. It is preferable that the CEMS 40 periodically transmits the configuration information to the power company 60.

In step 10, the CEMS 40 receives, from the power company 60, the power curtailment signal (DR; Demand Response) instructing restraint of the amount of power consumed. As described above, the power curtailment signal (DR; Demand Response) is determined in accordance with the configuration information.

In step $20_1$, the CEMS 40 transmits, to each HEMS 10, a notification request for requesting a notification of the amount of power that can be reduced from the power currently consumed. Here, the CEMS 40 transmits, to each HEMS 10, a notification request corresponding to the category C. The CEMS 40 performs processes in steps 110 and 120 after step $20_1$ (see also the sequence diagrams shown in FIG. 5 to FIG. 7).

In step $30_1$, the CEMS 40 receives, from each HEMS 10, reducibility information including the amount of power that can be reduced from the power currently consumed. Here, the CEMS 40 receives, from each HEMS 10, reducibility information corresponding to the category C.

In step $40_1$, the CEMS 40 determines whether or not power curtailment designated by the power curtailment signal is achieved. In this case, the CEMS 40 determines whether or not the power curtailment is achieved by reduction in power consumed by a load belonging to the category C.

When a determination result in step $40_1$ is "YES", the CEMS 40 performs a process in step 50 (see also the sequence diagram shown in FIG. 5). When the determination result in step $40_1$ is "NO", the CEMS 40 performs a process in step $20_2$.

In step $20_2$, the CEMS 40 transmits, to each HEMS 10, a notification request for requesting a notification of the amount of power that can be reduced from the power currently consumed. Here, the CEMS 40 transmits, to each HEMS 10, a notification request corresponding to the category B.

In step $30_2$, the CEMS 40 receives, from each HEMS 10, reducibility information including the amount of power that can be reduced from the power currently consumed. Here, the CEMS 40 receives, from each HEMS 10, reducibility information corresponding to the category B.

In step $40_2$, the CEMS 40 determines whether or not the power curtailment designated by the power curtailment signal is achieved. Here, the CEMS 40 determines whether or not the power curtailment is achieved by reduction in power consumed by loads belonging to the category C and the category C.

When a determination result in step $40_2$ is "YES", the CEMS 40 performs the process in step 50 (see also the sequence diagram shown in FIG. 6). When the determination result in step $40_2$ is "NO", the CEMS 40 performs a process in step $20_3$ (see also the sequence diagram shown in FIG. 7).

In step $20_3$, the CEMS 40 transmits, to each HEMS 10, a notification request for requesting a notification of the amount of power that can be reduced from the power currently consumed. Here, the CEMS 40 transmits, to each HEMS 10, a notification request corresponding to the category C.

In step $30_3$, the CEMS 40 receives, from each HEMS 10, reducibility information including the amount of power that can be reduced from the power currently consumed. Here, the CEMS 40 receives, from each HEMS 10, reducibility information corresponding to the category C.

In step 50, the CEMS 40 allocates the amount of power that should be reduced in each consumer 70 in accordance with reducibility information that is received for each category.

For example, in a case where the power curtailment is achieved by reduction in the power consumed by the load belonging to the category C (that is, in the sequence diagram shown in FIG. 5), the amount of power to be reduced R(i) is calculated by the following Equation (1).

$$R(i)=P_C(i) \times c(i) \times PDR/P_C\text{SUM} \qquad \text{Equation (1)}$$

wherein $$\Sigma P_C(i) \times c(i) = P_C\text{SUM}$$

In a case where the power curtailment is achieved by reduction in power consumed by loads belonging to the category C and the category B (that is, in the sequence diagram shown in FIG. 6), the amount of power to be reduced R(i) is calculated by the following Equation (2).

$$R(i)=P_C(i)+P_B(i) \times b(i) \times (PDR-P_C\text{SUM})/P_B\text{SUM} \qquad \text{Equation (2),}$$

wherein $$\Sigma P_B(i) \times b(i) = P_B\text{SUM}$$

For example, in a case where the power curtailment is not achieved by reduction in the power consumed by the loads belonging to the category C and the category B (that is, in the sequence diagram shown in FIG. 7), the amount of power to be reduced R(i) is calculated by the following Equation (3).

$$R(i)=P_C(i)+P_B(i)+P_A(i) \times a(i) \times (PDR-P_C\text{SUM}-P_B\text{SUM})/P_A\text{SUM} \qquad \text{Equation (3),}$$

wherein $$\Sigma P_A(i) \times a(i) = P_A\text{SUM}$$

In step 60, the CEMS 40 transmits, to each HEMS 10, reduction information including the amount of power that should be reduced in each consumer 70. It should be noted that the reduction information includes the amount of power to be reduced for each category. The CEMS 40 performs a process in step 130 after step 60 (see also the sequence diagrams shown in FIG. 5 to FIG. 7).

FIG. 5 to FIG. 7 are the sequence diagrams showing the power management method according to the first embodiment. In step 110, each HEMS 10 transmits, to each group of loads 20, a load information request for requesting the power consumed by the load included in the group of loads 20 (the power currently consumed).

In step 120, each HEMS 10 receives, from the group of loads 20, load information including the power consumed by the load included in the group of loads 20 (the power currently consumed).

In step 130, each HEMS 10 reduces the power consumed by the load included in the group of loads 20 in accordance with the reduction information received from the CEMS 40.

In the first embodiment, the CEMS 40 transmits, to the power company 60, the configuration information of the plurality of consumers 70 managed by the CEMS 40. Further, the power curtailment signal is determined in accordance with the configuration information of the plurality of consumers 70.

The amount of power that can be reduced is different for each consumer. Further, some consumers usually try to save power, and other consumers do not usually try to save power. Thus, when reduction in power consumed is requested uniformly to consumers, the sense of unfairness arises among the consumers. Therefore, the appropriate power curtailment signal is transmitted to each of a plurality of CEMSs 40, thereby making it possible to eliminate the sense of unfairness generated among the consumers 70 managed by each of the CEMSs 40.

In the first embodiment, the CEMS 40 that manages the plurality of HEMSs 10 transmits, to each HEMS 10, the reduction information in response to the reducibility information received for each category having a priority.

Thus, the CEMS 40 that manages the plurality of HEMSs 10 allocates the amount of power to be reduced in each consumer 70 after considering the amount of power that can be reduced for each consumer 70, and it is thus possible to restrain the sense of unfairness among the respective consumers.

If it is difficult to achieve a target amount to be reduced (for example, 10%), then the power company 60 may transmit a power curtailment signal indicating a larger amount to be reduced (for example, 15%) to reduce total power currently consumed by the target amount to be reduced in a whole of the plurality of consumers 70. However, by allocating the amount of power to be reduced, that is, an amount that can be reduced for each consumer 70, the CEMS 40 is capable of highly certainly achieving the target amount to be reduced. Thus, the power company 60 does not also need to increase the amount to be reduced designated by the power curtailment signal to be larger than the target amount to be reduced.

Further, since the reduction information is transmitted in response to the reducibility information received for each category having a priority, power consumed is reduced in order from power consumed by a load belonging to a category having a lower priority, thus restraining reduction in power that should be supplied to a load belonging to a category having a higher priority, that is, a load required for a daily life.

First Modification

A description will be given below of a first modification of the first embodiment. Differences from the first embodiment are mainly described, below.

In the first embodiment, the CEMS 40 collects, from each HEMS 10, the reducibility information corresponding to each category by transmitting the notification request corresponding to each category. On the other hand, in the first modification, each HEMS 10 transmits, to the CEMS 40, classification result information (power information) including amount of power consumed for each category to which a load connected to the HEMS 10 (a load included in the group of loads 20) belongs. The amount of power consumed included in the classification result information may be the amount of power that can be reduced for each category.

(Power Management Method)

Hereinafter, the power management method according to the first embodiment will be described. FIG. 8 is a sequence diagram showing an operation of the power management system 100 according to the first modification.

As shown in FIG. 8, in step 205, the CEMS 40 transmits, to the power company 60, the configuration information of the plurality of consumers 70 managed by the CEMS 40. It is preferable that the CEMS 40 periodically transmits the configuration information to the power company 60.

In step $210_1$, each HEMS 10 transmits, to each group of loads 20, the load information request for requesting the power consumed by the load included in the group of loads 20 (the power currently consumed).

In step $220_1$, each HEMS 10 receives, from the group of loads 20, the load information including the power consumed by the load included in the group of loads 20 (the power currently consumed). In this case, it should be noted that the load information includes the amount of power consumed for each category.

In step $230_1$, the CEMS 40 receives, from each HEMS 10, the classification result information including the amount of power consumed for each category to which the load connected to the HEMS 10 (the load included in the group of loads 20) belongs.

Here, processes in step $210_2$ to step $230_2$ are similar to processes in step $210_1$ to step $230_1$. That is, the CEMS 40 periodically receives the classification result information from each HEMS 10.

In step 240, the CEMS 40 receives, from the power company 60, the power curtailment signal (DR; Demand Response) instructing to restrain the amount of power consumed.

In step 250, the CEMS 40 allocates the amount of power that should be reduced in each consumer 70 in accordance with the classification result information including the amount of power consumed for each category.

For example, in a case where the power curtailment is achieved by reduction in the power consumed by the load belonging to the category C (that is, in a case where PDR≤$P_C$SUM is satisfied), the amount of power to be reduced R(i) is calculated by the following Equation (1).

$$R(i)=P_C(i) \times c(i) \times PDR/P_C\text{SUM} \quad \text{Equation (1)}$$

wherein $$\Sigma P_C(i) \times c(i) = P_C\text{SUM}$$

In a case where the power curtailment is achieved by reduction in the power consumed by the load belonging to the category C and the category B (that is, in a case where PDR≤$P_C$SUM+$P_B$ SUM is satisfied), the amount of power to be reduced R(i) is calculated by the following Equation (2).

$$R(i)=P_C(i)+P_B(i) \times b(i) \times (PDR-P_C\text{SUM})/P_B\text{SUM} \quad \text{Equation (2)},$$

wherein $$\Sigma P_B(i) \times b(i) = P_B\text{SUM}$$

In a case where the power curtailment is not achieved by reduction in the power consumed by the load belonging to the category C and the category B (that is, in a case where $P_C$SUM+$P_B$SUM<PDR is satisfied), the amount of power to be reduced R(i) is calculated by the following Equation (3).

$$R(i)=P_C(i)+P_B(i)+P_A(i) \times a(i) \times (PDR-P_C\text{SUM}-P_B\text{SUM})/P_A\text{SUM} \quad \text{Equation (3)},$$

wherein $$\Sigma P_A(i) \times a(i) = P_A\text{SUM}$$

In step 260, the CEMS 40 transmits, to each HEMS 10, the reduction information including the amount of power that should be reduced in each consumer 70. It should be noted that the reduction information includes the amount of power to be reduced for each category.

In step 270, each HEMS 10 reduces the power consumed by the load included in the group of loads 20 in accordance with the reduction information received from the CEMS 40.

Other Embodiments

The present invention has been described according to the aforementioned embodiment. It must not be understood that, however, the discussions and the drawings constituting a part of this disclosure limit the present invention. From this disclosure, various alternative embodiments, examples and operational techniques will be apparent to those skilled in the art.

In the embodiment, the HEMS 10 is employed as an example of the lower power management apparatus and the CEMS 40 is employed as an example of the upper power management apparatus; however, the embodiment is not limited thereto. The upper power management apparatus may suffice to manage a plurality of lower power management apparatuses. In other words, it suffices that the lower power management apparatus is managed by the upper power management apparatus. Further, the lower power management apparatus may be a BEMS (Building and Energy Management System) or a FEMS (Factory Energy Management System), for example.

In the embodiment, the CEMS 40 periodically receives, from each consumer 70 (HEMS 10), the classification result information including the amount of power consumed for each category. However, the embodiment is not limited thereto. For example, the CEMS 40 may request each consumer 70 (HEMS 10) to transmit the classification result information in response to the power curtailment signal (DR; Demand Response).

In the embodiment, the CEMS 40 periodically transmits, to the power company 60, the configuration information of the plurality of consumers 70. However, the embodiment is not limited thereto. For example, the CEMS 40 may transmit, to the power company 60, the configuration information of the plurality of consumers 70 in response to a configuration information request transmitted from the power company 60.

Note that the entire content of the Japanese Patent Application No. 2011-209957 (filed on Sep. 26, 2011) is incorporated herein by reference.

INDUSTRIAL APPLICABILITY

The present invention can provide a power management system, a power management method, and an upper power management apparatus with which it is possible to appropriately restrain an amount of power consumed by a load provided in each consumer.

The invention claimed is:

1. A power management system comprising:
    a power management apparatus configured to perform a process according to a power curtailment signal transmitted from a power company managing a power grid,
    wherein the power management apparatus transmits, to the power company that transmits the power curtailment signal, configuration information of a consumer managed by the power management apparatus,
    wherein the configuration information comprises one or more of an amount of power that can be supplied by a dispersed power source provided in the consumer and a predicted amount of power that can be supplied by the dispersed power source,
    wherein the power curtailment signal includes an amount of power that should be reduced from an amount of power currently consumed by a load connected to the power grid, and
    wherein the amount of power in the power curtailment signal is determined by the power company based on the any one of the amount of power that can be supplied by the dispersed power source and the predicted amount of power that can be supplied by the dispersed power source.

2. The power management system according to claim 1, the power management apparatus transmits the configuration information periodically.

3. The power management system according to claim 1, the power management apparatus transmits the configuration information in response to a request from the power company.

4. A power management method applied to a power management system comprising a power management apparatus configured to perform a process according to a power curtailment signal transmitted from a power company managing a power grid,
    wherein the power management apparatus transmits, to the power company that transmits the power curtailment signal, configuration information of a consumer managed by the power management apparatus,
    wherein the configuration information comprises one or more of an amount of power that can be supplied by a dispersed power source provided in the consumer and a predicted amount of power that can be supplied by the dispersed power source,
    wherein the power curtailment signal includes an amount of power that should be reduced from an amount of power currently consumed by a load connected to the power grid, and
    wherein the amount of power in the power curtailment signal is determined by the power company based on the any one of the amount of power that can be supplied by the dispersed power source and the predicted amount of power that can be supplied by the dispersed power source.

* * * * *